UNITED STATES PATENT OFFICE.

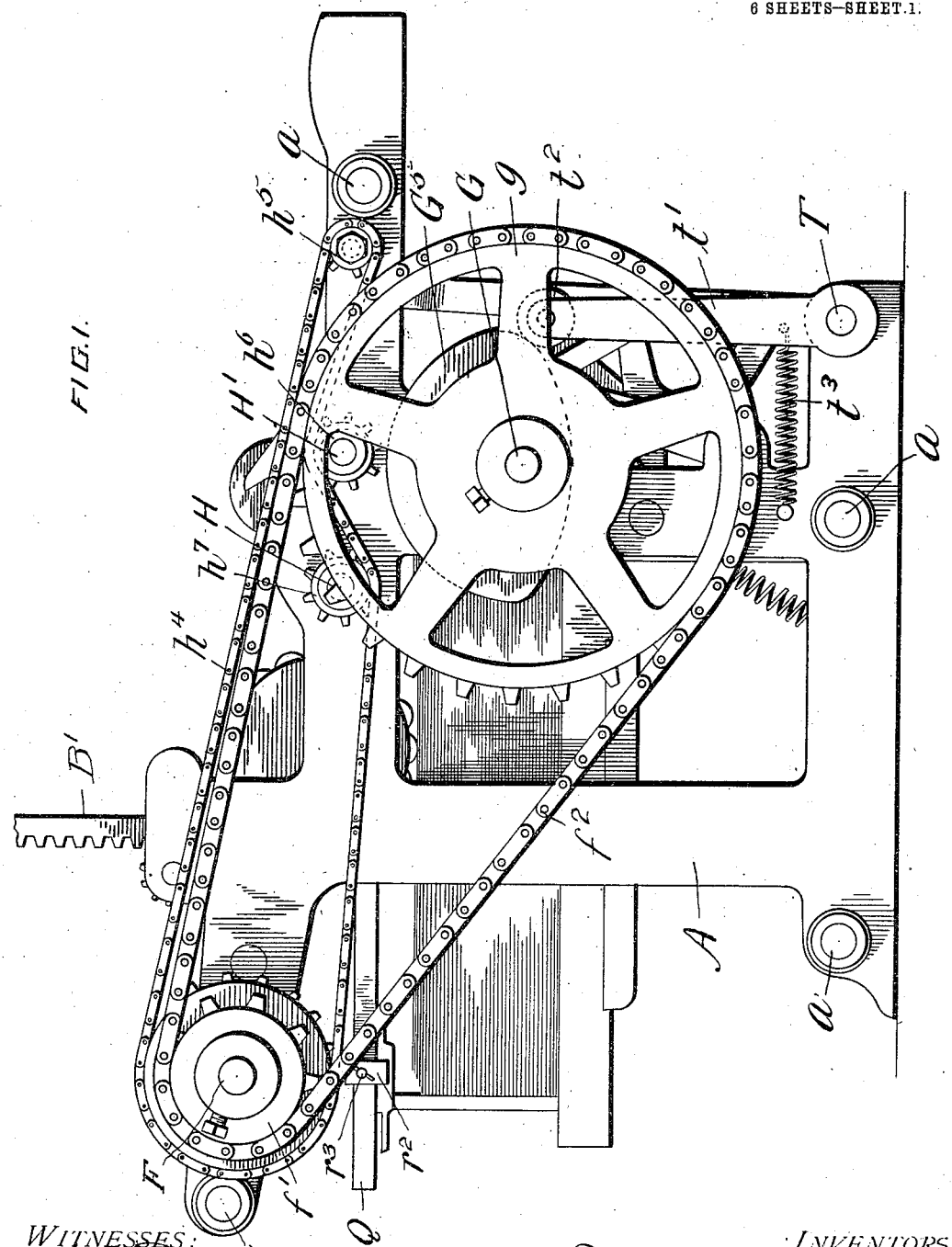

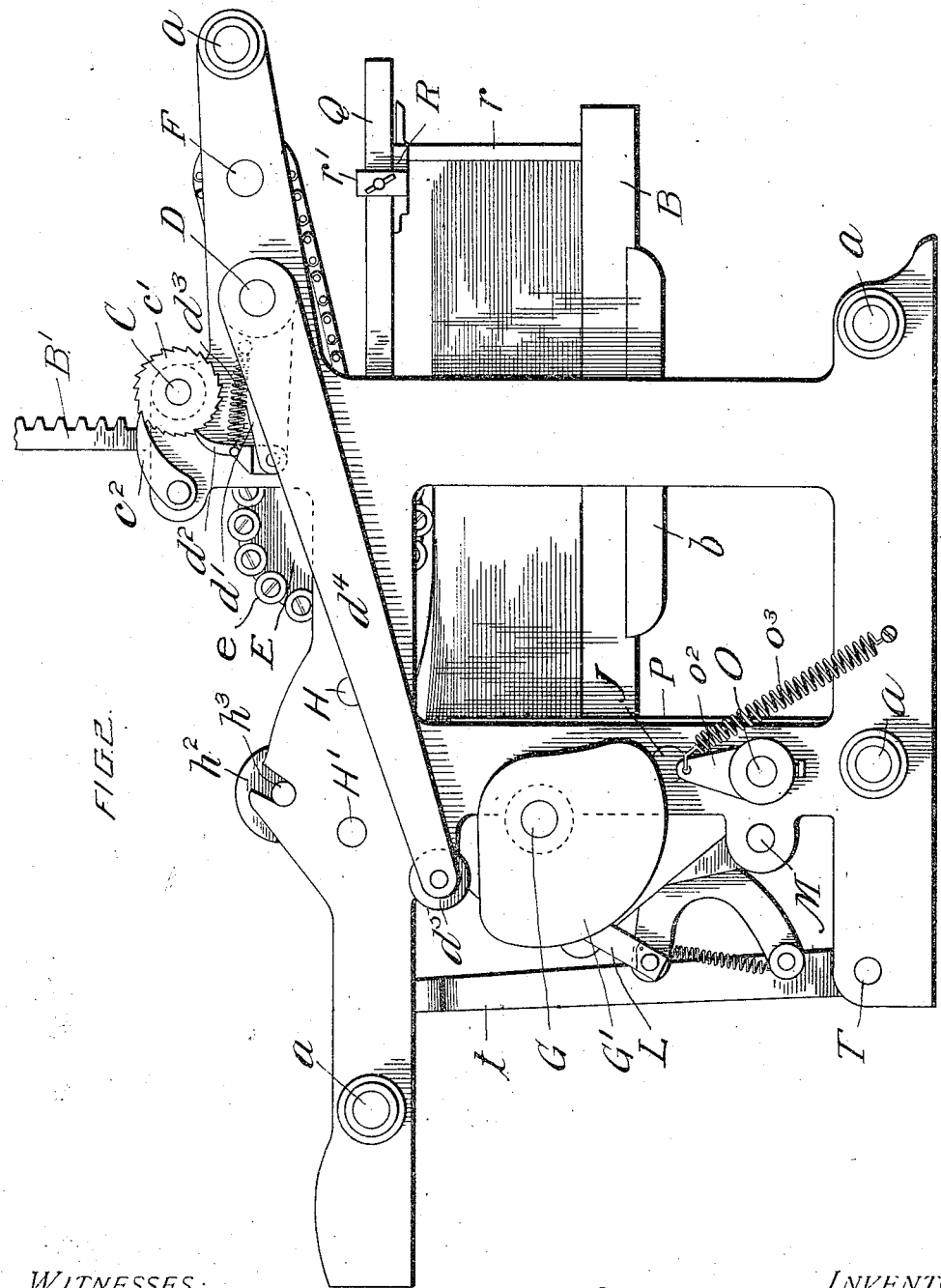

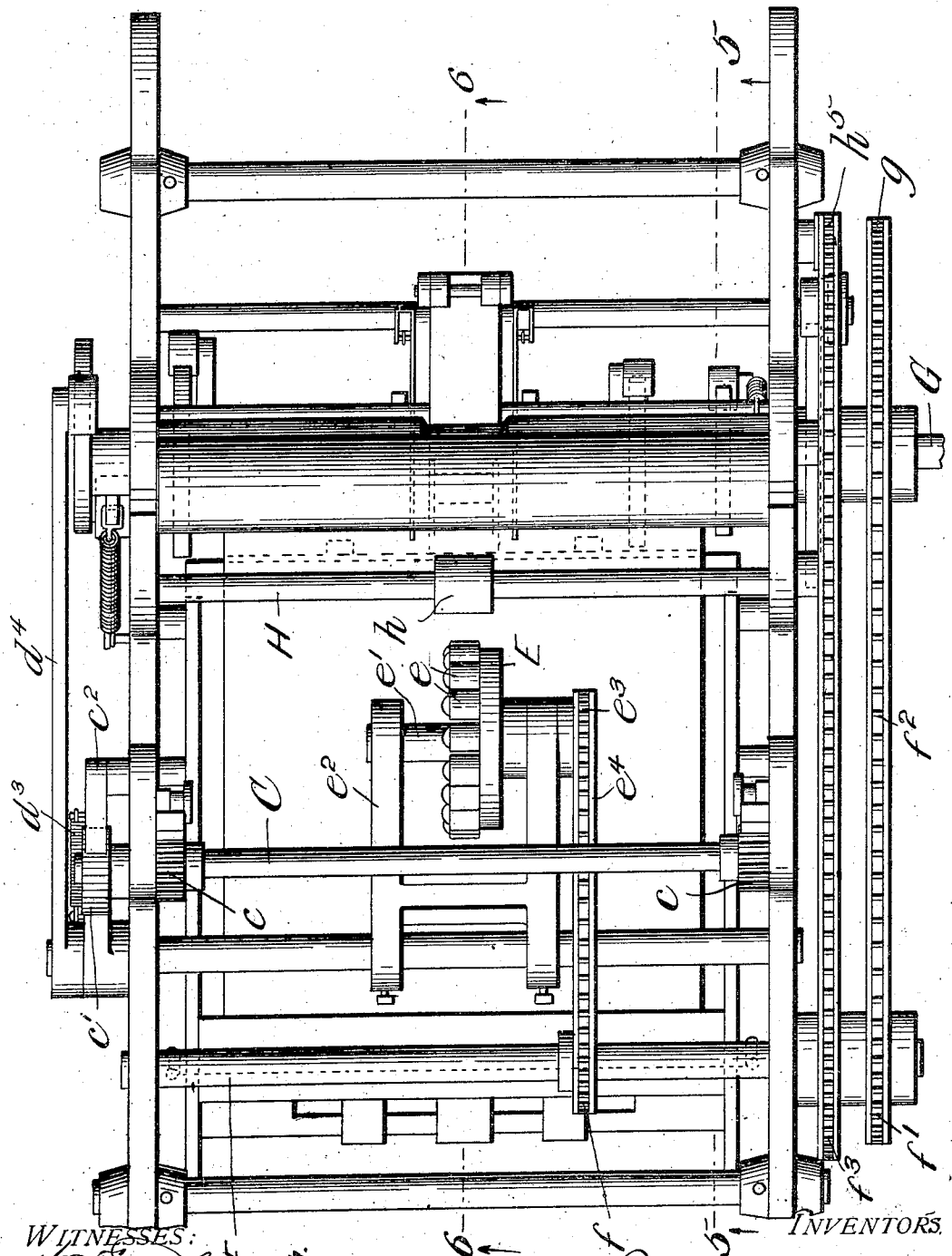

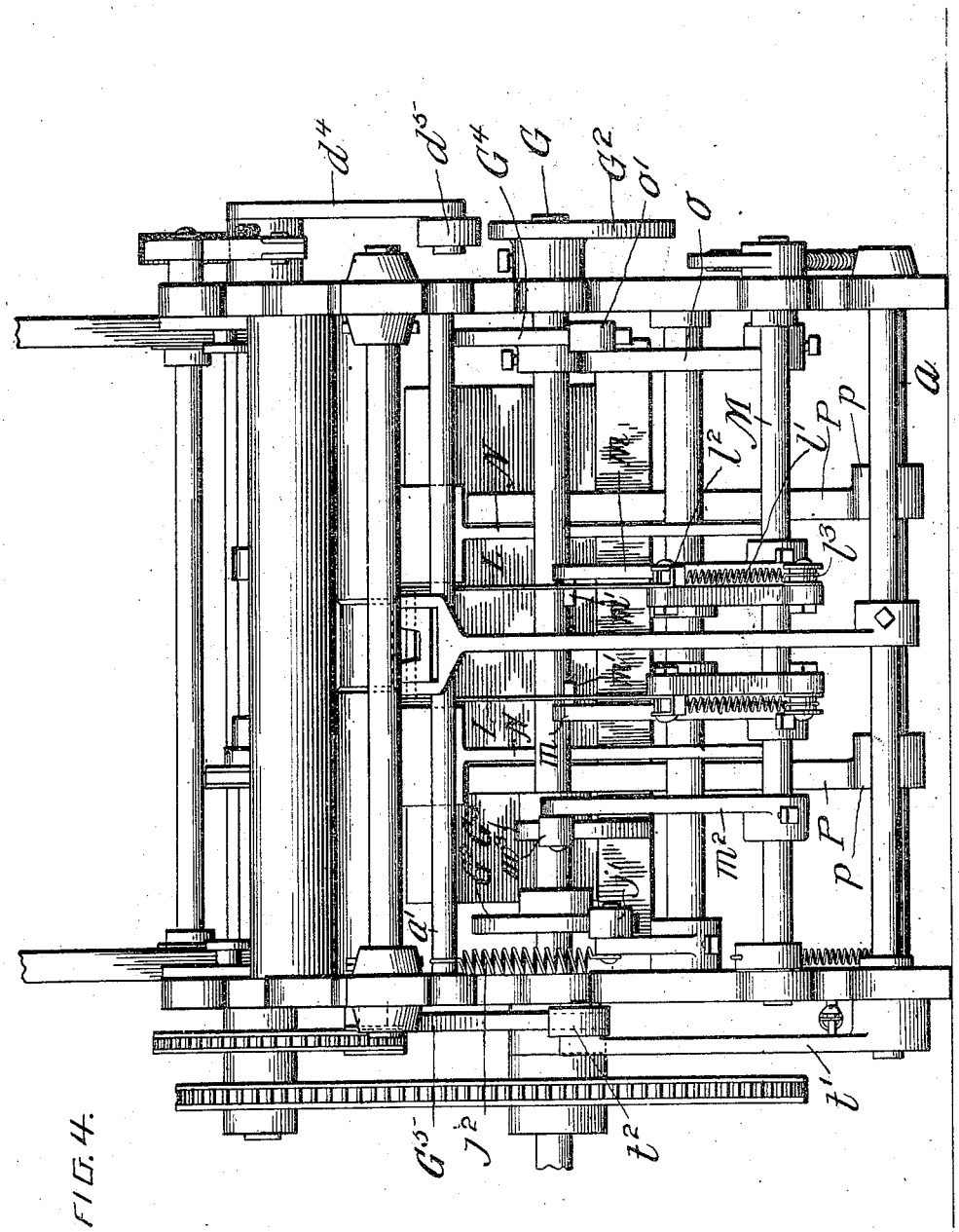

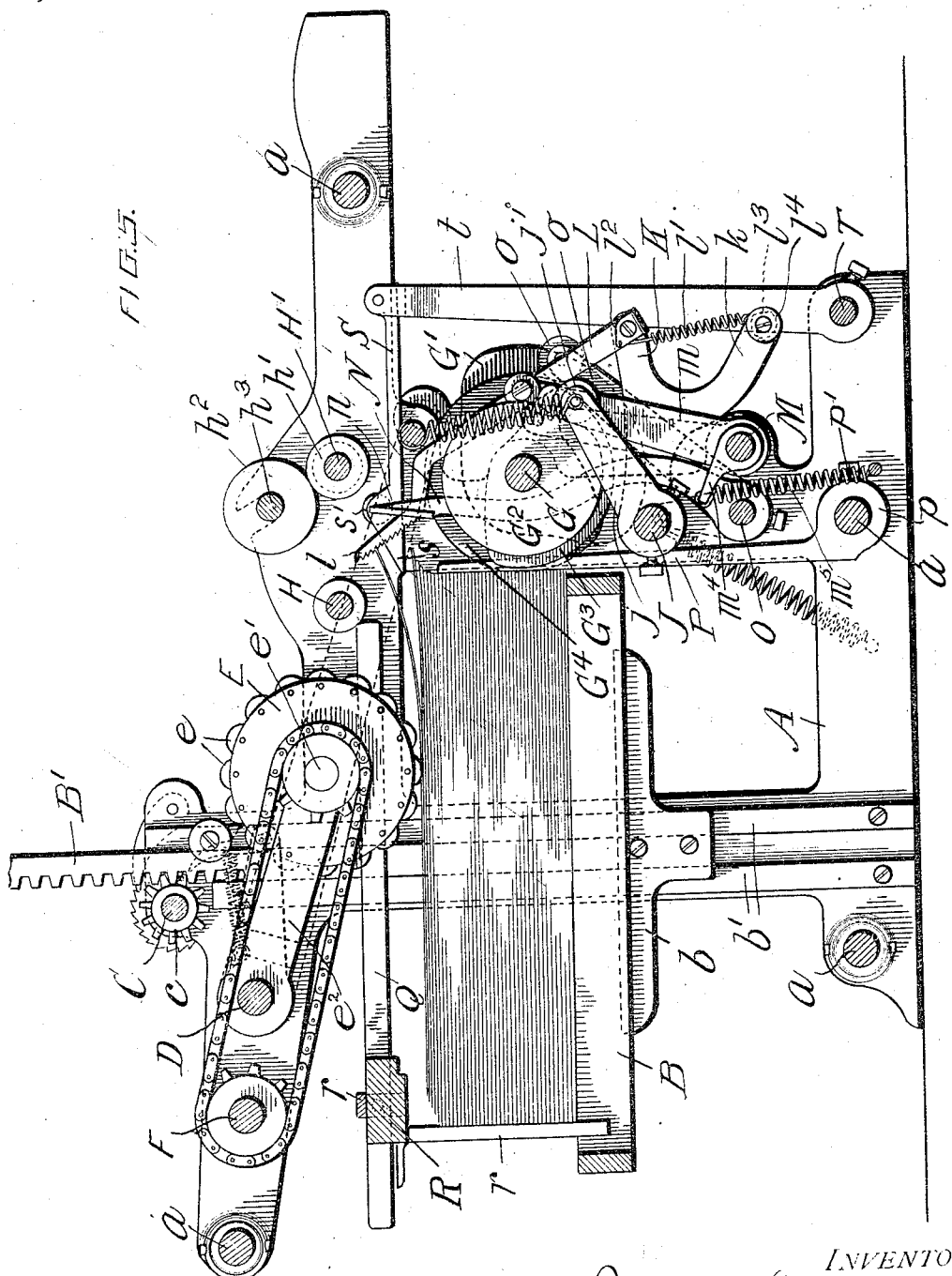

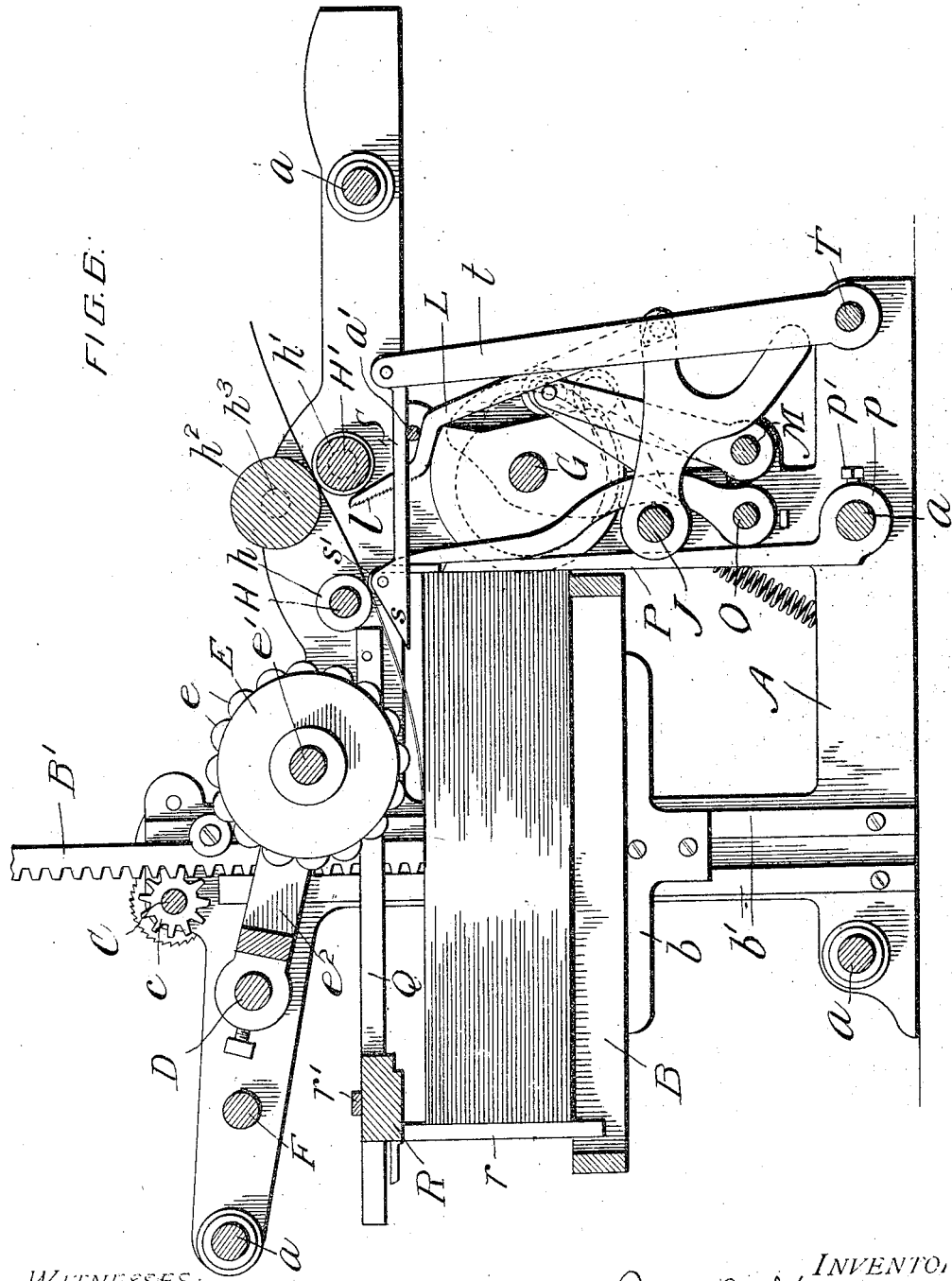

ROBERT E. KEMPER AND ARTHUR KEMPER, OF RENSSELAER, NEW YORK.

MACHINE FOR FEEDING SHEETS AND LIKE ARTICLES.

1,052,257.

Specification of Letters Patent.

Patented Feb. 4, 1913.

Application filed July 25, 1911. Serial No. 640,464.

*To all whom it may concern:*

Be it known that we, ROBERT E. KEMPER and ARTHUR KEMPER, citizens of the United States, residing at Rensselaer, in the county of Rensselaer and State of New York, have invented certain new and useful Improvements in Machines for Feeding Sheets and Like Articles; and we do hereby declare the following to be a full, clear, and exact description of the invention, such as will enable others skilled in the art to which it appertains to make and use the same.

Our invention consists in the novel features hereinafter described, reference being had to the accompanying drawings which show a form or embodiment of the invention which we have selected for the purpose of illustrating the same, and the invention is fully disclosed in the following description and claims.

Referring to the said drawings, Figure 1 represents a right side elevation of the machine or embodiment of our invention which we have selected for purposes of illustration. Fig. 2 is a left side elevation of the same. Fig. 3 is a top plan view of the machine. Fig. 4 is a front elevation thereof. Fig. 5 is a vertical longitudinal sectional view of the machine taken on the line 5—5, Fig. 3, looking in the direction of the arrows in that figure, the parts being shown in the positions which they occupy when the comber has combed forward the topmost sheets of the pile, the separators have raised the topmost sheet from the pile and the dividing device or wedge has entered slightly beneath the topmost sheet. Fig. 6 is a vertical longitudinal sectional view of the machine taken on the line 6—6, Fig. 3, looking in the direction of the arrows in that figure and showing the parts in the positions which they occupy when the topmost sheet has been partially fed.

The object of our invention is to provide an apparatus for automatically feeding in rapid succession sheets of paper or other like articles, to a printing press or for any other purpose. In carrying out our invention we provide means for supporting the sheets or articles to be fed singly, in a vertical pile without the necessity of having the sheets or other articles "fanned out;" mechanism is provided for combing or fanning out or pushing forward the topmost sheets or articles, the topmost sheet being combed out farther than the adjacent sheets; separating mechanism is also provided for separating the topmost sheet from the rest of the pile and a dividing device is provided which is moved between the separated sheet and the balance of the pile and preferably carries the sheet into engagement with a feed roller, which is preferably a continuously moving roller and which feeds and delivers the sheet selected by the separating and dividing mechanism; means are also provided for pushing back the upper sheets of the pile which may have been partially thrust forward when the topmost sheet was combed out, so that the topmost sheet will always occupy a predetermined position at the beginning of each cycle of operation of the apparatus. Means are also provided for automatically advancing the support for the pile of sheets or other articles, so as to maintain the topmost sheet in practically uniform relation with the parts of the apparatus which operate thereon and particularly with respect to the "comber" as we term the device for combing or forming out the top sheet.

Referring to the particular embodiment of the invention which we have selected for purposes of illustration and which will now be described in detail, A, A represent the side frames of the machine which are connected by suitable cross bars $a$, $a$ to form a rigid structure capable of supporting various parts of the mechanism.

B represents the feed table which is supported upon horizontal brackets $b$, $b$ each of which is secured to a vertically disposed rack bar B' mounted in guides $b'$, secured to the inner faces of the side frames A, A. The rack bars B', B' are engaged by pinions $c$, $c$ secured to a transverse actuating shaft C mounted in bearings in the side frames. The shaft C is provided at one end, see Fig. 2, with a ratchet wheel $c'$ which is engaged by a locking pawl $c^2$ secured to the adjacent side frame and also by a pawl $d^2$ pivoted to a short arm $d'$ secured to a rock shaft D mounted in the side frames of the machine, the said pawl $d^2$ being held in engagement with the ratchet wheel $c'$ by a spring $d^3$.

The rock shaft D just referred to carries the "comber" or device for fanning or combing out the topmost sheet of the pile. In this instance we have shown for this purpose a rotary disk E provided with a plurality of small idle rolls $e$, the peripheries of which extend beyond the periphery of the disk. The disk E is mounted on a shaft $e'$ which is carried at the outer end of a frame $e^2$ which is rigidly secured to the rock shaft D. Rotary motion is imparted to the comber in any suitable manner. In this instance the shaft $e'$ is provided with a sprocket wheel $e^3$ engaged by the sprocket chain $e^4$ which passes over a driving sprocket $f$ on a shaft F mounted in the side frames of the machine and provided with a sprocket wheel $f'$ which is connected by means of a chain $f^2$ with a driving sprocket $g$ on the main driving or cam shaft G of the machine, which is mounted in the side frames adjacent to the forward part thereof. We also provide means for elevating the comber out of contact with the pile of sheets or other articles during a portion of the cycle of the machine and for lowering it into contact with the topmost sheet at the proper point in the cycle. For this purpose we have shown an arm $d^4$ (Figs. 2, 3 and 4) secured to the rock shaft D and provided at its outer end with a friction roll $d^5$ which is engaged by a cam G' on the shaft G.

It will be noticed that the arm $d^4$ and cam G' in addition to raising and lowering the comber, also operate the arm $d'$ and pawl $d^2$ so as to effect a rotation of the shaft C, thereby slowly and gradually raising the rack bars B' and the paper supporting device or table B. This vertical feed of the paper operates automatically regardless of the variations in thickness of the sheets of paper or other articles to be fed, for, should the table B be raised more rapidly than the thickness of the sheets withdrawn from the pile warrants, when the comber descends upon the top of the pile the friction roller $d^5$ will not be permitted to descend to its lowest position (as indicated in Fig. 2) and therefore, the succeeding upward movement of the arm $d^4$ will not be sufficient to move the ratchet wheel $c'$ the full extent of one tooth and further feeding of the paper support upwardly will be suspended until a sufficient number of sheets have been withdrawn from the pile to enable the arm $d^4$ to make under the operation of the cam G', a sufficient movement to effect a further feed of the ratchet wheel $c'$.

$h$ represents the feed roller which is mounted upon the shaft H, supported in the side frames above the delivery end of the table B and we also prefer to provide a delivery roller $h'$ forward of the feed roller $h$ and an idle roller $h^2$ located above and in contact with the delivery roller $h'$ for taking the sheets or articles as fed by the feed roller $h$ and delivering them from the machine. The delivery roller $h'$ is mounted on a shaft H' carried in the side frames and the idle roller $h^2$ is provided with gudgeons $h^3$ which engage vertically disposed guides or slots in the side frames or parts secured thereto, for holding the idle roller in its proper position. In this instance continuous motion is transmitted to the feed roller $h$ and the delivery roller $h'$ by means of a sprocket chain $h^4$ which passes around a driving sprocket $f^3$ on the shaft F, and an idle sprocket $h^5$ secured to one of the side frames at the forward end of the machine, said chain passing over a sprocket $h^6$ on the shaft H' and under a sprocket $h^7$ on the shaft H.

In order to separate the topmost sheet from those beneath it, we employ one or more separators, each of which consists of a yieldingly mounted arm L provided at its upper end with notched or serrated portions $l$, see Figs. 5 and 6. The toothed portion $l$ of the separator may be integral with or attached to the main portion L. In this instance it is shown integral. One or more of said separators may be employed, as desired, and in the present instance we have shown two of the same. Each of the separators L is pivotally secured to the outer end of an arm K which is rigidly secured to a rock shaft J mounted in the side frames of the machine for the purpose of controlling the movements of both separators. Each of the separators L is normally pressed yieldingly toward the pile of sheets or like articles by means of a very light spring $l'$ suitably connected to the separator L at one end and having its other end connected to an arm $k$ projecting downwardly from the arm K. On account of the delicacy of touch which these separators must have, we find it convenient and desirable to form the separator from a piece of sheet steel or other metal in the form of a blade, the lower end of which is bent outwardly and then upwardly to form a short arm $l^2$ and the pivot connecting the separator to the outer end of the arm K, passes through both the main body of the separator and the short parallel portion or arm $l^2$, thus providing an elongated bearing for this pivotal connection. The upper end of the spring $l'$ is preferably connected to the short arm $l^2$, as shown in Fig. 5 and the lower end of the spring is provided with a flexible connection $l^3$ which is wound upon a small drum $l^4$ secured in position on the arm $k$ by a screw or bolt and by turning this drum more or less the tension of the spring can be very delicately adjusted.

The shaft $J$ which carries the arms $K$ to which the separators are connected, is provided with an actuating arm $j$ having at its outer end a friction roller $j'$ which engages a cam $G^2$ on the shaft $G$, said cam being constructed to impart the desired movement to the separator or separators. The friction roller $j'$ is held in engagement with the cam $G^2$ by means of a spring $j^2$ secured at one end to the arm $j$ and at the other end to a stationary part of the machine, in this instance a cross bar $a'$, see Fig. 4.

Each of the separators $L$ is disengaged from the sheet or like article and held normally out of engagement therewith during a portion of the cycle of the machine, by a device which we term a kick-off, one of said devices being provided for each of the separators. Each kick-off consists of a vertically disposed arm $m$ (rigidly secured to a rock shaft $M$ mounted in the side frames of the machine) and provided at its upper end with a stud or pin $m'$ for engaging the separator on the rear side thereof. The rock shaft $M$ is provided with an arm $m^2$ extending upwardly therefrom and provided with a friction roll $m^3$ which engages a cam $G^3$ on the shaft $G$ for operating the kick-offs at the proper time. The actuating arm $m^2$ is held in engagement with the cam $G^3$ by a spring and in this instance we have shown for this purpose a spring $m^5$ connected at one end to one of the side frames and at the other end to a rearwardly extending arm $m^4$, Fig. 5, secured to the rock shaft $M$.

The operation of the comber in fanning out the topmost sheet, will ordinarily also fan out or comb out several of the uppermost sheets to a less extent, by reason of the frictional contact between the several sheets and we provide devices which we term "joggers" for the purpose of pushing back all of the sheets thus disturbed, except the topmost sheet, which will be fed and delivered as hereinafter described. One or more of these joggers may be employed, two being shown herein. Each of these joggers consists of a vertically disposed arm $N$ rigidly secured to a rock shaft $O$ mounted in the side frames and each of said arms $N$ is provided at its upper end with a vertically disposed plate portion $n$ extending laterally on one or both sides of the arm, in this case on both sides as clearly shown in Fig. 4. The rock shaft $O$ is provided with an actuating arm $o$ carrying at its outer end a friction roller $o'$ which engages a cam $G^4$ on the shaft $G$. The friction roller $o'$ is held in engagement with said cam by means of a spring, in this instance a spring $o^3$, see Fig. 2, connected to the frame of the machine at one end and at the other end to an arm $o^2$ secured to the rock shaft $O$. At the proper time in the cycle of the machine, the cam $G^4$ permits the spring $o^3$ acting through the arm $o^2$ and rock shaft $O$, to move the joggers rearwardly and push back the sheets at the top of the pile which have been combed out at the same time as the topmost sheet.

We also provide stationary guiding devices for engaging the front and rear edges of the sheets or other articles in the pile carried by the supporting table $B$ for holding the sheets or other articles in alinement upon said table. The front guides consist of vertically disposed arms $P$ provided at their lower ends with collars $p$ rigidly but adjustably secured to one of the cross bars $a$ of the machine, as clearly shown in Figs. 5 and 6; in this instance the collars $p$ are secured to the cross bar by a set screw $p'$.

The rear guide consists of a cross bar $R$ provided with depending guide fingers $r$ engaging the rear ends of the sheets or other articles, the said cross bar being supported on horizontal rails $Q, Q$ secured to the side frames of the machine. In this instance the cross bar $R$ is provided with a strap $r'$ extending over the top of the same and having its end extending downwardly outside of the rails $Q$, the cross bar $R$ lying between said rails, and the downwardly extending ends $r^2$ of the strap are provided with set screws $r^3$ for securing the cross bar rigidly in position with respect to the rails $Q$. Obviously the cross bar may be adjusted to different positions on the rails, toward and from the front guides $P, P$ to accommodate sheets or articles of different lengths.

As the sheets or articles may frequently be of less length than the table or support $B$, said table or support is preferably made of open or slatted construction with longitudinal openings between the slats in vertical alinement with the fingers $r$ of the rear guides, so that said fingers will not interfere with the vertical movement of the table $B$, as shown in the drawings, in Figs. 5 and 6 of which the fingers $r$ are shown extending into the open portions of the table.

We also provide mechanism for positively dividing the topmost sheet after its edge has been elevated by the separator or separators, from the balance of the sheets in the pile and for bringing into action a pressure roller which presses the topmost or separated sheet into contact with the rotating feed roller $h$. These parts need not of necessity be connected with each other; in the embodiment of the invention which we have selected for purposes of illustration, however, we have shown them combined and comprising a dividing device having a wedge shaped portion to enter the space below the topmost sheet when the latter is raised, and carrying the pressure roller.

S represents the divider which is disposed horizontally and arranged to reciprocate. It consists of a horizontal plate which is supported in part upon the cross rod $a'$ upon which it slides and in part by a vertical arm $t$ to which it is pivotally connected at its outer or foremost end. The arm $t$ is rigidly secured to a rock shaft T mounted in the lower part of the side frames and said rock shaft is provided with an actuating arm $t'$ carrying at its upper end a friction roller $t^2$ engaging a cam $G^5$ on the shaft G, see Figs. 4 and 6. The rearward end of the divider is made wedge shaped as shown at $s$ and in rear of said wedge shaped portion a pressure roller $s'$ is mounted rotatably in the divider, said pressure roller being in line with the feed roller $h$ and adapted to press the separated sheet or other article into contact with the feed roller $h$.

The operation of the machine is as follows: The pile of sheets or other articles to be fed by the machine is placed upon the table B with the front edges against the front guides P, the table B being lowered by releasing the pawls $c^2$ and $d^2$ and allowing the rack bars to slide to their lowest position. The rear guide is then adjusted so as to engage the rear edges of the pile of sheets or other articles. Assuming that the machine is in position to commence its cycle of operations and that the comber is in raised position, the table B is then raised by hand until the topmost sheet is nearly in engagement with the comber when the machine may be started. The machine is operated either by hand or by power, but preferably by power, motion being imparted in any desired way to the shaft G. When the machine is in operation, the comber will drum or fan out the uppermost sheets as indicated in Fig. 5, the topmost sheet being fanned or combed out farther than those immediately beneath it, the front guides P terminating at this point below the top of the pile so as not to interfere with this fanning out or combing out operation. At the same time the kick-offs are moved backward so as to permit the separators to move rearwardly until their serrated portions $l$ engage the forward edge of the topmost sheet which projects slightly beyond the corresponding edge of the sheet beneath it and the separators are then elevated by means of the spring $j^2$ operating in conjunction with a suitable grade of the cam $G^2$, thereby lifting the front edge of the topmost sheet in a direction toward the feed roller $h$ as clearly shown in Fig. 5. At the same time the cam $G^3$ permits the arm $t'$ to be drawn rearwardly by a spring $t^3$ connected at one end to said arm and at the other end to the adjacent side frame A, thereby turning the rock shaft T and causing the arm $t$ to move rearwardly together with the divider S, thus carrying the wedge shaped portion $s$ of the divider beneath the top sheet as clearly shown in Fig. 5. As the operation continues the divider S continues to move rearwardly, the separators which have performed their functions are lowered and the kick-offs are moved outwardly so as to withdraw the separators from engagement with the sheet or article to be fed and the divider moving still farther rearwardly brings the pressure roller $s'$ into engagement with the sheet above it and presses the sheet against the feed roller $h$. At the same time the cam $G'$, raises the comber off of the pile and the feed roller $h$, which rotates rapidly, frictionally feeds the top sheet between it and the pressure roller $s'$, the sheet passing thence between the delivery roller $h'$ and the idle roll or top roll $h^2$, as clearly shown in Fig. 6. At the same time the joggers are operated rearwardly, their upper ends or plate portions which, as shown, extend above the front guides P, striking the front edges of the uppermost sheets of the pile below the selected sheet or topmost sheet, force them back to their original position against the rear guide fingers $r$, as also clearly shown in Fig. 6. The further operation of the machine discharges the sheet which is being operated upon by the feed roller $h$ and delivery roller $h'$, from the machine and restores the various parts of the mechanism to their original position. It is not necessary that the joggers should push the topmost sheet beneath the selected sheet entirely back against the guide fingers $r'$, but we prefer to so adjust the machine that this will be done. It is only necessary that they should push any of the uppermost sheets which have been disturbed, back beyond the rear end of the divider, so as to preclude the divider passing over instead of under the sheet next to be selected.

The sheets or other articles may be delivered to a printing press or other machine or for any other purpose that may be desired.

While we have shown herein only one comber, and one dividing device, it is to be understood that we may employ two or more of each if found desirable. We may also employ any desired number of separators, and any desired number of joggers. While we have shown the separators so arranged that they shall be reciprocated vertically, this is not essential to the operation f the machine, as the action of the comber or combers in combing out the topmost sheet brings the forward edge of said sheet into contact with the yielding separators, which lie in a rearwardly inclined position, hence the continued action of the comber acting against the yielding separators will in any case cause the forward edge of the sheet to be raised by the separators far enough to permit the dividing device or wedge to pass beneath it.

It is to be understood that we do not limit ourselves to the exact details of construction of the various parts shown in this embodiment of our invention, as variations may be made therein without departing from the invention.

What we claim and desire to secure by Letters Patent is:—

1. In a machine for feeding sheets and like articles, the combination with a supporting table, a feed roller adjacent to one edge of said table, and a pressure roller, and means for moving the pressure roller toward and from the feed roller, of a separator consisting of a thin metal blade, having one end provided with serrated portions, and having its other end provided with an arm lying parallel to but at a distance from and connected to the main portion of the blade, a movable actuating arm for said separator, a pivot connecting said blade and arm and extending through the integral parallel arm thereof, whereby an elongated bearing for the pivotal connection of said separator blade is provided.

2. In a machine for feeding sheets and like articles, the combination with a supporting table, a feed roller adjacent to one edge of said table, and a pressure roller and means for moving the pressure roller toward and from the feed roller, of a separator, consisting of a thin metal blade having one end provided with serrated portions, an actuating arm pivotally connected to said blade, a spring connected to said blade, a winding drum carried by a part connected to said arm, a flexible connection secured at one end to said spring and having its other end engaging said winding drum, and means for securing said winding device in any position to which it may be adjusted.

3. In a machine for feeding sheets and like articles, the combination with a supporting table, a feed roller adjacent to one edge of said table, and a pressure roller and means for moving the pressure roller toward and from the feed roller, of a separator, consisting of a thin metal blade, having one end provided with serrated portions and having at its other end a short arm lying parallel to but at a distance from the blade and connected therewith, an actuating arm for said blade, a pivot connecting said actuating arm and the blade and extending through the blade and the said parallel arm thereof, a spring connected at one end to the said short arm, and provided at its other end with a flexible connection, a winding drum carried by a part connected with said actuating arm, and having said flexible connection wound thereon, and means for securing said drum in its adjusted position.

4. In a machine for feeding sheets or like articles, the combination with means for supporting a pile of the articles to be fed, means for lifting portions of the topmost article, a feed roller, located adjacent to the position of said pile, a divider provided with a roller adapted to coöperate with the feed roller, and means for moving said divider beneath the lifted portions of said topmost article to permit its roller to press the said article into engagement with the feed roller.

5. In a machine for feeding sheets or like articles, the combination with means for supporting a pile of the articles to be fed, means for raising the topmost article at one end, a feed roller, a horizontally movable divider provided with a portion adapted to pass beneath the raised portion of the topmost sheet, a roller carried by said divider for forcing the separated sheet into contact with the feed roller to withdraw and feed the same, and means for reciprocating said divider.

6. In a machine for feeding sheets or like articles, the combination with means for supporting a pile of sheets or like articles, of a movably mounted separating device provided with serrated portions disposed obliquely to the plane of the topmost sheet and located adjacent to one end of the pile, means for advancing the topmost sheet into engagement with the separating device, to elevate the end portions of the sheet engaged thereby, a feed roller for withdrawing the sheets from the pile and feeding them, a dividing device adapted to pass beneath the raised portions of the topmost sheet, a roller carried by said dividing device, and means for moving said dividing device toward the pile of sheets to cause its roller to press the separated topmost sheet into contact with the feed roller.

7. In a machine for feeding sheets or like articles, the combination with a supporting table, of a movably mounted separating device provided with serrated portions disposed obliquely to the plane of the topmost sheet, and located adjacent to one end of said table, and a combing device for combing the topmost sheet into engagement with the said separator, whereby the end of the sheet will be raised, sheet delivering devices and a dividing device adapted to pass beneath the lifted sheet and means for moving the dividing device to force the lifted sheet into engagement with the delivering devices.

8. In a machine for feeding sheets or like articles, the combination with a supporting table, of a comber located above the same, for advancing the topmost sheet, a movable separator disposed obliquely to and extending across the plane of the topmost sheet, means for operating the comber to cause it to move the topmost sheet toward the separator and a horizontally moving dividing device, and means for moving the dividing device toward and from the comber, to cause it to pass beneath the sheets as they are raised by the comber and separator.

9. In a machine for feeding sheets or like articles, the combination with a supporting table, of a comber located above the same, a separator for engaging and lifting the topmost article, a feed roller, a movable dividing device having a portion adapted to pass beneath the topmost article, means for moving said dividing device toward and from the pile of articles on the table, and a pressure roller carried by said dividing device, and adapted to press the selected article into engagement with the feed roller.

10. In a machine for feeding sheets or like articles, the combination with a supporting table, of a rotary comber located above the same, a feed roller adjacent to one end of the table, a separator disposed obliquely to and across the plane of the topmost sheet on the table, means for operating the comber to move the topmost sheet toward and into engagement with the separator to raise the edge of the sheet, a horizontally movable divider, provided with a pressure roller, adapted to pass beneath the topmost sheet when its edge is raised and press it into engagement with the feed roller.

11. In a machine for feeding sheets or like articles, the combination with a supporting table, of a rotary comber located above the same, a separator disposed obliquely to and across the plane of the topmost sheet and provided with a serrated surface, means for operating the comber to move the topmost sheet toward the separator, a feed roller, a movable divider adapted to pass beneath the topmost sheet and provided with a pressure roller for forcing the sheet above it into contact with the feed roller, and means for raising the comber out of contact with the topmost sheet when the latter has been placed in engagement with the said rollers.

12. In a machine for feeding sheets and like articles, the combination with a vertically movable supporting table, of a comber supported above the same, means for separating and feeding the topmost article, mechanism for raising and lowering the comber, out of and into contact with the pile of articles on the table, including a pivoted arm connected with the comber, and an actuating cam for engaging a part connected with said arm, elevating mechanism for said table including a ratchet wheel and a feed pawl operatively connected with said pivoted arm and engaging said ratchet wheel whereby over feed of the table will lift said pivoted arm partially out of contact with said cam, and prevent the full operation of the elevating mechanism thereby.

13. In a machine for feeding sheets and like articles, the combination with a vertically movable table, of stationary front guides for positioning a pile of articles thereon, located at the delivery end of the table, said guides having their upper ends terminating below the plane of the top of the pile, a rotary comber engaging the topmost sheet, means for raising and lowering the comber, a jogger having portions extending above the upper ends of the front guides, and a separator for lifting the edge of the topmost sheet, a divider adapted to be moved beneath the topmost sheet when the latter is raised, and means for moving the jogger toward and from the pile of sheets.

14. In a machine for feeding sheets and like articles, the combination with a vertically movable supporting table, stationary guides for the articles on said table, a comber supported above said table, means for raising and lowering said comber, a separator for engaging the topmost article, a dividing device adapted to pass beneath the topmost article, a feed roller, a pressure roller for pressing the separated article into contact with the feed roller, and a jogger movable toward and from the table, for replacing the articles below the topmost article, which may have been drummed out by the comber.

15. In a machine for feeding sheets and like articles, the combination with the supporting table, a comber supported above the table, means for raising and lowering the comber, a separator having a serrated portion for engaging the edge of the topmost article of a pile of articles on said table, a feed roller, a dividing device having a wedge shaped portion, means for moving said wedge shaped portion beneath the topmost article before the comber is raised out of contact with the articles on the table, and means for pressing the separated article into contact with the feeding roller.

16. In a machine for feeding sheets and like articles, the combination with a vertically movable supporting table, of mechanism for elevating said table, a comber supported above said table, means for raising and lowering said comber, guides adjacent to said table for holding a pile of sheets in position thereon, a continuously rotating feed roller, a separator for engaging and separating the top sheet of the pile, a movable dividing device, means for moving said dividing device into and out of position below the top sheet, a movable jogger for engaging the upper sheets of the pile below the top sheet, and restoring them to their proper position on the pile, operating mechanism for the jogger, a pressure roller carried by the said dividing device adapted to press the top sheet against the feed roller, a delivery roller adjacent to the feed roller, a pressure roller coöperating therewith and driving mechanism for the said feed and delivery rollers.

In testimony whereof we affix our signatures, in the presence of two witnesses.

ROBERT E. KEMPER.
ARTHUR KEMPER.

Witnesses:
J. O. SNYDER,
C. LIVINGSTON.

Copies of this patent may be obtained for five cents each, by addressing the "Commissioner of Patents, Washington, D. C."